US008302156B2

(12) United States Patent
Wu

(10) Patent No.: US 8,302,156 B2
(45) Date of Patent: Oct. 30, 2012

(54) COMPUTER INFORMATION SECURITY SYSTEM AND OPERATION METHOD THEREOF

(76) Inventor: Ming-Jing Wu, Taipei (TW)

( * ) Notice: Subject to any disclaimer, the term of this patent is extended or adjusted under 35 U.S.C. 154(b) by 346 days.

(21) Appl. No.: 12/708,189

(22) Filed: Feb. 18, 2010

(65) Prior Publication Data

US 2011/0202990 A1    Aug. 18, 2011

(51) Int. Cl.
*H04L 29/06* (2006.01)
(52) U.S. Cl. .............. 726/2; 726/26; 711/164; 455/26.1
(58) Field of Classification Search .................. 726/2, 26
See application file for complete search history.

(56) References Cited

U.S. PATENT DOCUMENTS

2011/0215921 A1 *   9/2011   Ben Ayed et al. ........ 340/539.11

* cited by examiner

*Primary Examiner* — Jason K. Gee
*Assistant Examiner* — Ayoub Alata
(74) *Attorney, Agent, or Firm* — Muncy, Geissler, Olds & Lowe, PLLC

(57) ABSTRACT

The present invention relates to a computer information security system and method, the system includes a connection device and a sensor. When the connection device plug in to the predetermined computer, the sensor and the connection device are conjoint, a first identification code can be stored to the computer through the connection device, and generated an initialization setting of the second identification code to the sensor through the connection device. Therefore, when the sensor is out of the predetermined range of the connection device, the connection device will control the computer for encoding to prevent unauthorized user to use the computer; when the sensor is located within the range of the predetermined range of the connection device, the connection device will automatically input the first identification code to the computer to enable the user to directly use the computer without inputting the first identification code to avoid the complicated procedure of inputting the first identification code when the user return to work on the computer, thus to reinforce the security to the information in the computer and to make the operation more convenient.

2 Claims, 4 Drawing Sheets

COMPUTER INFORMATION SECURITY SYSTEM AND OPERATION METHOD THEREOF

BACKGROUND OF THE INVENTION

1. Field of the Invention

The present invention relates to a computer information security system and operation method thereof. When the sensor is out of a predetermined range of the connection device, the computer executes a screen protection mode to prevent unauthorized user to use the computer; and when the sensor is located nearby to the connection device, the user need not input the first identification code to operate the computer. Thus, the information is properly secured in the computer and renders the operation more convenient.

2. Description of Related Art

The computers are multifunctional and are popularly used everywhere to become essential in daily activities. Due to the convenience provided by the computer to store information, people usually save some confidential information in the computer. For preventing unauthorized user to access the confidential information stored in the computer, users use a lots of different ways to protect them. The conventional methods of protecting information stored in the computer mostly include Smart card, the finger print identification system or operation password for the basic input/output system (BIOS).

The method of using Smart card includes inserting the Smart card into the slot of the computer for logging onto the network. However, this method does not secure the computer while turning on or waking up from the screen protection mode. Therefore, the unauthorized user still can operate the computer even without the Smart card despite being unable to log onto the network. This shows that the protection to the information stored in the computer is insufficient.

Furthermore, the fingerprint identification system may be used to secure the computer to identify the user's fingerprint for turning on the computer, and the computer can operate only when the identification is authenticated. However, the hardware cost of the fingerprint identification system is high and the fingerprint identifying device and software are required.

The third method, BIOS, includes setting up the operation password for protection, wherein the user is required to input the password for turning on the computer, and the computer can operate only when the inputted password is authenticated. But when the computer is in use, the BIOS need not require inputting the password once again and anyone can use the computer. As can be understood from the above description, none of the method above methods secures the computer during the usage, and the screen protection program of the windows operating system is created to add up more protection to the computer, the user can set up a period of time to run the screen protection for the idling computer. For canceling the screen protection, the user has to input the user name and password to keep out the unauthorized user. However, every time the user leaves the computer longer than the preset period of time, the user has to input the name and the password over and over again. Besides, the user has to remember the password and spend time to input the information, causing just another trouble for the user.

Therefore, how to solve the above defects has become the important issue for the suppliers in the field.

SUMMARY OF THE INVENTION

An object of the present invention includes a microprocessor in a connection device, wherein the microprocessor of the connection device are respectively connected to the connection interface and the transmission unit. The processing unit of the sensor is connected to a transmission interface. When the connection device is connected to the computer through the connection interface and the sensor is plugged into the connection device. A second identification initialization code is generated between the connection device and the sensor. Thus, when the sensor is located out of the predetermined range of the connection device, the connection device will control the computer to run the screen protector mode for preventing other user to access the computer; and when the user positions the sensor within the predetermined range of the connection device, the connection device will automatically input a first identification code to the computer. The user need not input the first identification code manually to release the computer from the screen protection mode to allow access to the computer. Thus, the information may not only be effectively secured but also provide joy and more convenience.

BRIEF DESCRIPTION OF THE DRAWING

For a more complete understanding of the present invention, reference will now be made to the following detailed description of preferred embodiments taken in conjunction with the following accompanying drawings.

DETAIL DESCRIPTION OF THE INVENTION

Figure 1:
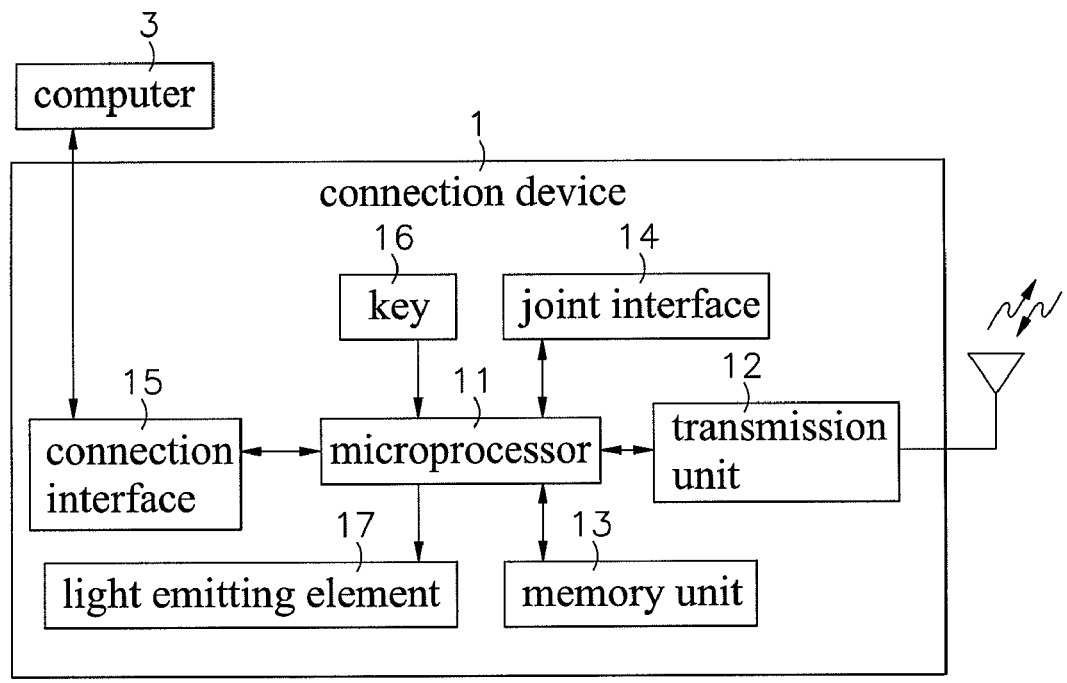
FIG. 1 is a block diagram of a circuit according to an embodiment of the present invention.
Figure 1:
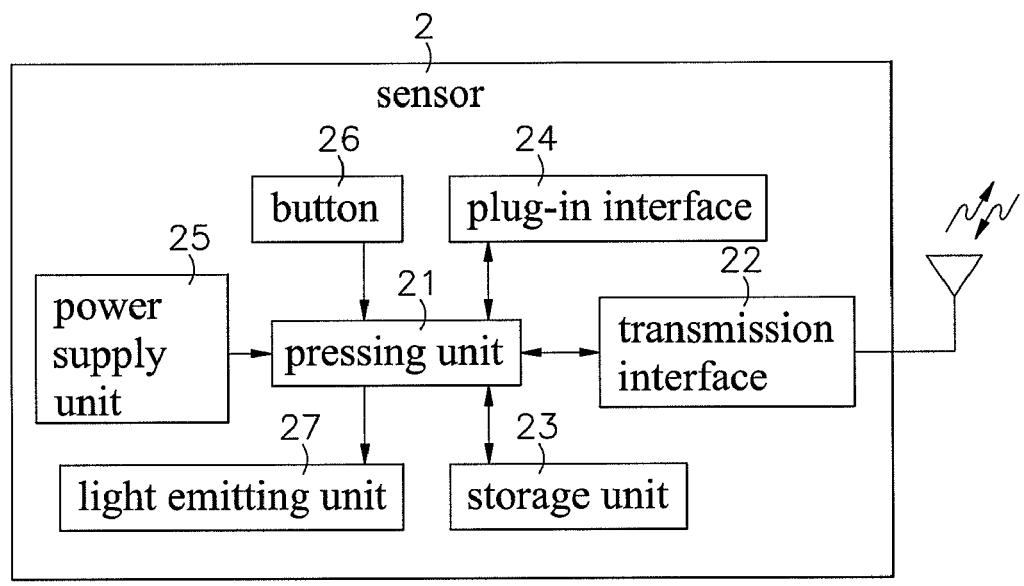

FIG. 1 is a block diagram of a circuit according to an embodiment of the present invention. The computer information security system and method comprises a connection device 1 and a sensor 2.

The connection device 1 comprises a microprocessor 11 connected to a transmission unit 12, a memory unit 13, a joint interface 14, a connection interface 15, a key 16 and a light emitting element 17 respectively.

The sensor 2 comprises a processing unit 21 which is respectively connected to a transmission interface 22, a storage unit 23, a plug-in interface 24, a power supplying unit 25, a button 26 and a light emitting unit 27.

At the first time use of the connection device 1 and the sensor 2, the user is required to setup a driving program of connection device 1 in advance to the predetermined computer 3. The connection device 1 is plugged into the corresponding connector (not shown) of the computer 3 through the connection interface 15. The connection device 1 may be built in the computer 3. In the operation system of computer 3, it has a screen protection program which can be set a waiting time, user name and user password, and, run a screen protection mode (encoding status) after the preset waiting time upon a idling computer for unauthorized access. To adapt the plug-in interface 24 of the sensor 2 into the joint interface 14 of the connection device 1, the driving program in the computer 3 will request the user to enter to the screen protection mode of the operation system in the computer 3 to input the first identification code, for instance, the user name and the password, and for setting up the waiting time (for example one minute) for the screen protection program, and the memory unit 13 of the connection device 1 and the computer 3 respectively store the first identification code (for example, user name and user password). When the external force is applied to press the key 16 of the connection device 1, the connection device 1 detects whether or not it is connected to the sensor 2; if it is connected to the sensor 2, the button 26 of the sensor 2 is pressed to generate a random second identification code (for example a connection code 65534 and a transmission channel 11) between the connection device 1 and the sensor 2. Meanwhile, the second identification code is respectively stored in the memory unit 13 of the connection device 1 and the storage unit 23 of the sensor 2. Thus, the setting of the connection procedure is completed. The light emitting element 17 of the connection device 1 generates light to notify the user to remove the sensor 2 from the connection device 1.

Accordingly, when the user carries the sensor 2 away the predetermined range of the connection device 1, the microprocessor 11 of the connection device 1 will control the computer 3 for encoding, for example, to enter to the screen protection mode, to unable other user to use the computer 3. The transmission interface 22 of the sensor 2 and the transmission unit 12 of the connection device 1 mutually and wirelessly transmit signals for confirmation in every preset of time period (for example 30 seconds); the transmission interface 22 and the transmission unit 12 corresponding to wireless transmission elements includes, for example, RF or Bluetooth.

The signal transmission method of the above transmission interface 22 of the sensor 2 and the transmission unit 12 of the connection device 1 can be unidirectional or bidirectional wireless signal transmission, in order to confirm the connection device 1 and the sensor 2 as a group, as well as to confirm the corresponding second identification code. Therefore, any modification and variations would be construed to fall within the spirit and scope of the present invention.

When the sensor 2 is located within the predetermined range of the connection device 1, the microprocessor 11 of the connection device 1 will check whether or not the sensor 2 and the connection device 1 are a group having the corresponding second identification code, due to the possibility of plurality of users using the sensor 2 of the present invention in the same office, so the connection device 1 has to detect whether the sensor 2 has the same corresponding second identification code. If there is none, the microprocessor 11 of the connection device 1 will control the computer 3 for encoding (for example, to enter to the screen protection mode) after the preset time (for example one minute). If the connection device 1 detects the same corresponding second identification code from the sensor 2 as a group, the microprocessor 11 of the connection device 1 will automatically transmit the first identification code to the computer 3 to enable the user to operate the computer 3. Thus, the user needs not input the first identification code after returning to work on the computer, and the user can still use the computer 3 even when the user forgets the first identification code. Therefore, the present invention can substantially protect the information stored in the computer 3 with more convenient operation.

Figure 2:
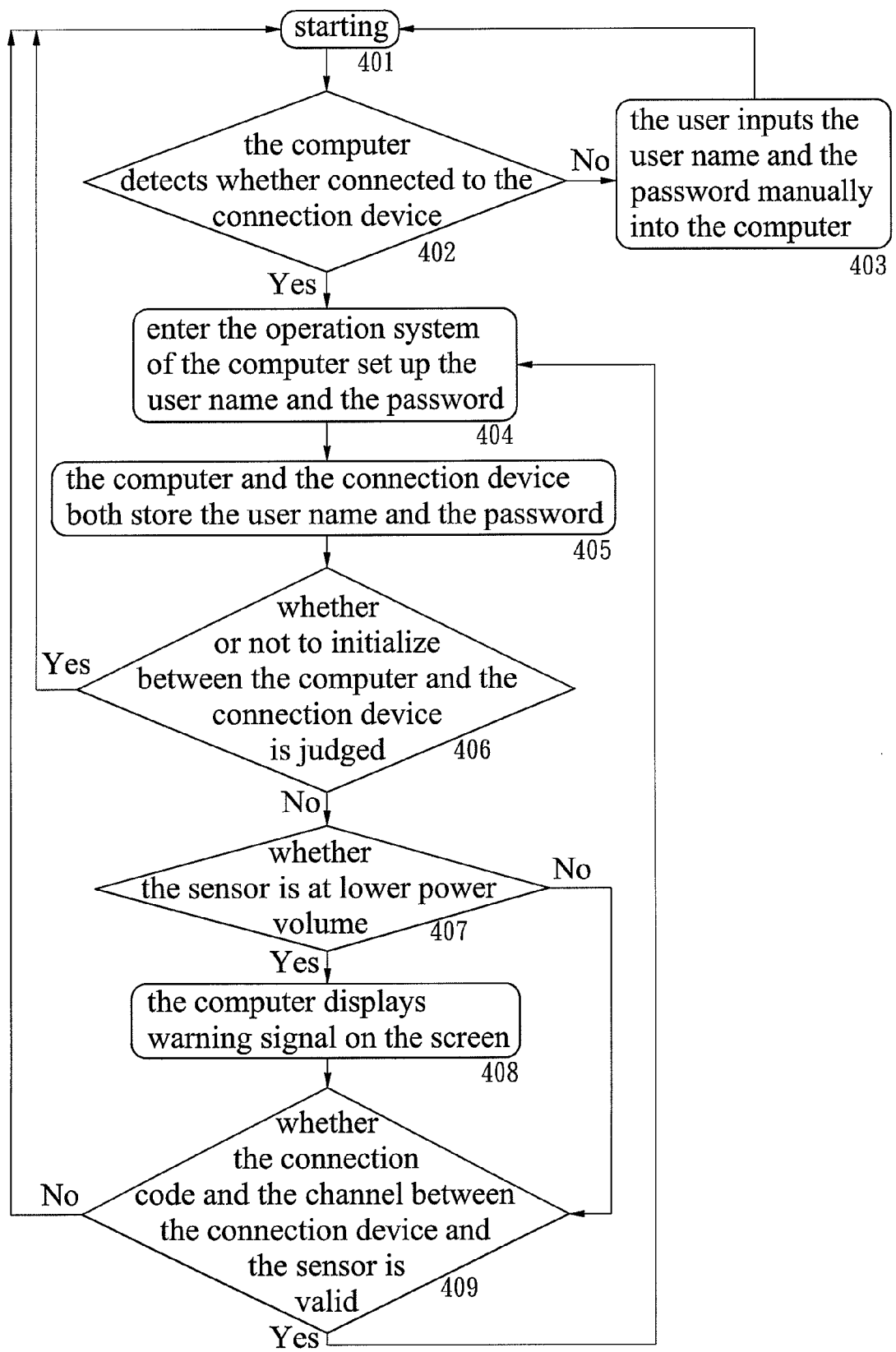
FIG. 2 is an operation flowchart of a computer according to an embodiment of the present invention.

Referring to FIGS. 1 and 2, a block diagram of a circuit and an operation flowchart of a computer according to an embodiment of the present invention are illustrated. The steps in the procedure are described as follows.

At step 401, starting the procedure.

At step 402, the computer 3 detects whether the connection device 1 is connected, and if the connection device 1 is detected, the procedure proceeds to step 404, otherwise the procedure proceeds to step 403.

At step 403, the user inputs the user name and the password manually into the computer 3.

At step 404, the operation system of the computer 3 set up the user name and the password.

At step 405, the computer 3 and the connection device 1 both store the user name and the password.

At step 406, whether or not to initialize the computer 3 and the connection device 1 is judged, wherein if it is judged to initialize the computer 3, the procedure proceeds to step 401, otherwise proceed to step 407.

At step 407, whether the sensor 2 is at lower power, wherein if the sensor is at lower power, the procedure proceeds to step 408, otherwise proceed to step 409.

At step 408, the computer displays warning signal on the screen.

At step 409, whether the connection code and the channel between the connection device 1 and the sensor 2 is valid, wherein if it is valid, the procedure proceeds to step 404, otherwise the procedure proceeds to step 401.

The computer 3 detects whether the connection device 1 is plugged in, wherein if the connection device 1 is not plugged in, the computer 3 will enter to the screen protection mode, and the user is required to manually input the first identification code (user name and the password) to cancel the screen protection; and if the connection device 1 is plugged in the computer 3, the microprocessor 11 of the connection device 1 will control the computer 3 to enable the user to set up the waiting time for the screen protection program, user name and the password, and respectively store the backup of the user name and the password in the computer 3 and the memory unit 13 of the connection device 1, then inquires whether to initialize the computer 3 and the connection device 1. If initialization is not necessary, the microprocessor 11 of the connection 1 will detect whether the power supply unit 25 of the sensor 2 is at lower power volume; if it's in lower power volume, the microprocessor 11 of the connection device 1 will control the computer 3 to display the warning signal in the screen (not shown); if it's not in lower power volume, the microprocessor 11 of the connection device 1 will directly inspect whether the second identification code (connection code and channel) between the connection device 1 and the sensor 2 is valid. The user can return to setup the waiting time of the screen protection program and the first identification code (user name and password) if it's valid. If it's invalid, the computer 3 detects whether having the connection device 1 plugged in.

Figure 3:
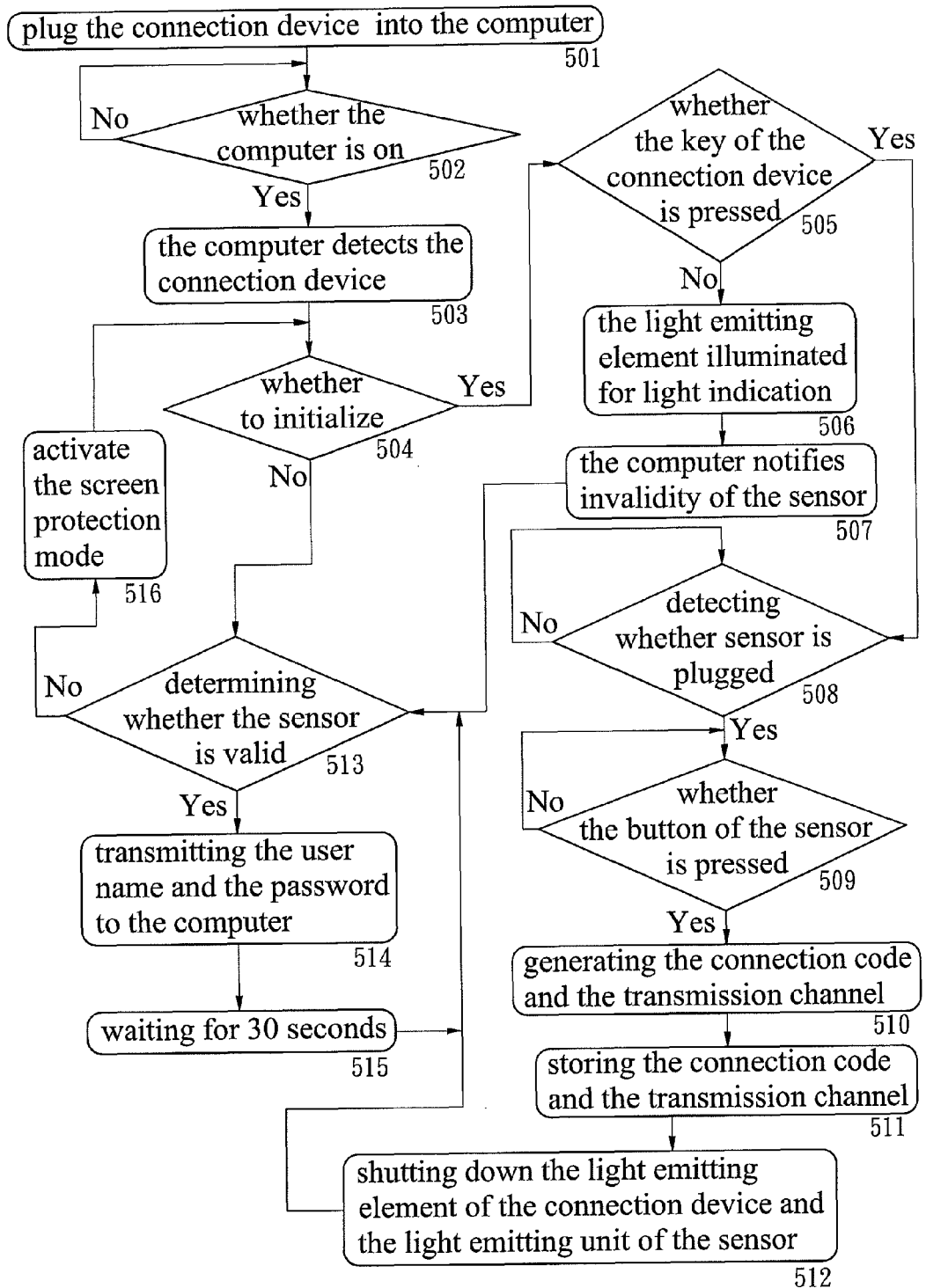
FIG. 3 is an operation flowchart of a connection device according to an embodiment of the present invention.

Referring to FIGS. 1 and 3, a block diagram of a circuit and an operation flowchart of a connection device according to an embodiment of the present invention are illustrated. The steps of the procedure may be described as follows.

At step 501, plug the connection device 1 into computer 3.

At step 502, whether the computer 3 is on is determined, wherein if it is determined the computer 3 to be on, the procedure proceeds to step 503, otherwise the procedure proceeds to step 502.

At step 503, the computer 3 detects the connection device 1.

At step 504, whether to initialize is determined, if it is determined to be initialize, the procedure proceeds to step 505, otherwise the procedure proceeds to step 513.

At step 505, whether the key 16 of the connection device 1 is pressed is determined, if it is determined that the key 16 is pressed, the procedure proceeds to step 508, otherwise the procedure proceeds to step 506.

At step 506, the light emitting element 17 illuminated for light indication.

At step 507, the computer 3 notifies invalidity of the sensor 2, the procedure proceeds to step 513.

At step 508, whether sensor 2 is plugged in is determined, if it is determined the sensor 2 is plugged in, the procedure proceeds to step 509, otherwise the procedure returns to step 508.

At step 509, whether the button 26 of the sensor 2 is pressed is determined, wherein if it is determined to be pressed, the procedure proceeds to step 510, otherwise the procedure returns to step 509.

At step 510, the connection code and the transmission channel are generated.

At step 511, the connection code and the transmission channel are stored.

At step 512, the light emitting element 17 of the connection device 1 and the light emitting unit 27 of the sensor 2 are shut down.

At step 513, whether the sensor 2 is valid is determined, if it is determined to be valid, the procedure proceeds to step 514, otherwise the procedure proceeds to step 516.

At step 514, the user name and the password are transmitted to the computer 3.

At step 515, standing by for 30 seconds, and the procedure proceeds to step 513.

At step 516, entering the screen protection mode, and the procedure proceeds to step 504.

Therefore, the connection device 1 is connected to the computer 3 through connection interface 15, and the user confirms whether the computer 3 is on; if it is confirmed that the computer 3 is on, the computer 3 confirms connection to the connection device 1 and not connected to other devices, for example the memory stick or car reader. The computer 3 requires whether to initialize the connection device 1 and the sensor 2 to the user, if it is needed, the user can press the key 16 of the connection device 1, if the key 16 is not pressed, the light emitting element 17 of the connection device 1 illuminates for the light indication to notify the computer 3 that the sensor 2 is invalid through the microprocessor 11 of the connection device 1; if the key 16 of the connection device 1 is pressed, the user has to check whether the joint interface 14 of the connection device 1 is plugged into the plug-in interface 24 of the sensor 2. When the joint interface 14 of the connection device 1 is plugged in to the plug-in interface 24 of the sensor 2, user presses the button 26 of the sensor 2 to generate the corresponding connection code and the transmission channel between the microprocessor 11 of the connection device 1 and the processing unit 21 of the sensor 2, and store respectively into the memory unit 13 of the connection device 1 and the storage unit 23 of the sensor 2. The light emitting element 17 of the connection device 1 and the light emitting unit 27 of the sensor 2 are turned off, the microprocessor 11 of the connection device 1 confirms whether the sensor 2 is valid, if it is invalid, the microprocessor 11 of the connection device 1 will control the computer 3 to enter to the screen protection mode. If it is valid, the microprocessor 11 of the connection device 1 automatically transmits the user's first identification code (user name and password) to the computer 3 through the connection interface 15 to cancel the screen protection mode. The valid or invalid determination is by judging there have corresponding second identification code (for example as a group of items and the corresponding second identification code) between connection device 1 and sensor 2. The connection device 1 and the sensor 2 will mutually transmit signals every preset period of time (for example 30 seconds) in order to confirm whether the sensor is valid (for example as a group of items and the corresponding second identification code).

Figure 4:
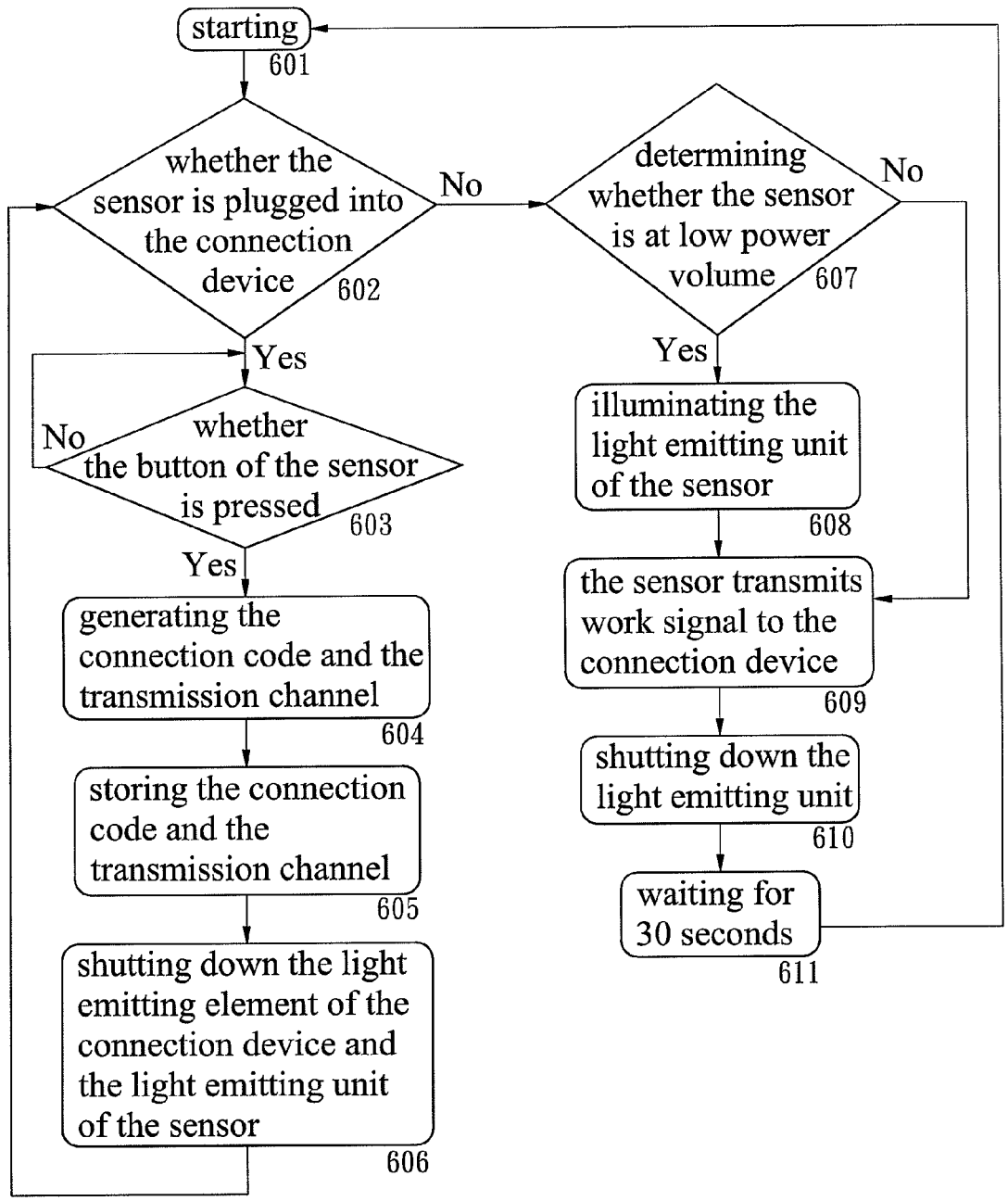
FIG. 4 is an operation flowchart of a sensor according to an embodiment of the present invention.

Referring to FIGS. 1 and 4, a block diagram of a circuit and an operation flowchart of a sensor according to an embodiment of the present invention are illustrated. The process steps may be described as follows.

At step 601, starting the procedure.

At step 602, whether the sensor 2 is plugged into the connection device 1 is determined, if it is to be plugged in, the procedure proceeds to step 603, otherwise the procedure proceeds to step 607.

At step 603, whether the button 26 of the sensor 2 is pressed is determined, if it is determined to be pressed, the procedure proceeds to step 604, otherwise the procedure proceeds to step 603.

At step 604, the connection code and the transmission channel are generated.

At step 605, the connection code and the transmission channel are stored.

At step 606, the light emitting element 17 of the connection device 1 and the light emitting unit 27 of the sensor 2 are shut down, and the procedure proceeds to step 602.

At step 607, whether the sensor 2 is at low power volume is determined, if is, the procedure proceeds to step 608, if is not, the procedure proceeds to step 609.

At step 608, the light emitting unit 27 of the sensor 2 is illuminated.

At step 609, the sensor 2 transmits work signal to the connection device 1.

At step 610, the light emitting unit 27 is shut down.

At step 611, wait for 30 seconds, and the procedure returns to step 601.

Therefore, the microprocessor 11 of the connection device 1 detects whether the sensor 2 is plugged, if it is plugged, the user can press the button 26 of the sensor 2 to generate the corresponding second identification code (connection code and transmission channel) mutually between the microprocessor 11 of the connection device 1 and the processing unit 21 of the sensor 2, and to respectively store into the memory unit 13 of the connection device 1 and the storage unit 23 of the sensor 2. The light emitting element 17 of the connection device 1 and the light emitting unit 27 of the sensor 2 will turn off, and whether or not the sensor 2 is plugged in will be detected. If the above joint interface 14 of the connection device 1 is not connected with the interface 24 of the sensor 2, the microprocessor 11 of the connection device 1 detects whether the sensor 2 is at lower power volume, if it is detected to be at lower power volume, the light emitting unit 27 of the sensor 2 illuminated and a work signal is transmitted to the connection device 1; if it is not, the sensor 2 will directly transmit the work signal to the connection device 1, and the sensor 2 will shut down the light emitting unit 27 and wait for the preset period of time (for example 30 seconds) for repeating the above steps to let the microprocessor 11 of the connection device 1 detects whether the sensor 2 is plugged.

When the above power supplier unit 25 of the sensor 2 is exhausted, the connection device 1 will transmit a signal to the computer 3, thus the computer 3 displays the signal (not shown) in the connected screen to show the low power volume or the weak signal warning. The user can plug the connection device 1 to the computer 3 through the connection interface 15, and connect the transmission interface 22 of the sensor 2 to the transmission unit 12 of the connection device 1. Next, the user is required to input the first identification code (user name and password) into the computer 3, and the second identification code will be generated over again between the connection device 1 and the sensor 2. Furthermore, the computer 3 charges the power supplier unit 25 of the sensor 2 through the connection device 1.

Additionally, the processing unit 21 of the sensor 2 can be connected to a fingerprint identification unit (not shown), and the user's fingerprint information can be stored into the storage unit 23 of the sensor 2; when the sensor 2 is located nearby the connection device 1, the user presses finger against the fingerprint identification unit for the fingerprint identification unit of the sensor 2 to verify; if the fingerprint is correct, the sensor 2 will transmit a signal to the connection device 1, and the connection device 1 will further automatically transmit the first identification code (user name and password) to the computer 3 to enable the user to use the computer 3; if the fingerprint is incorrect, the connection device 1 will control the computer 3 into the screen protection mode.

The computer information security system and method in the present invention has at least the following advantages.

1. When the sensor 2 is located within the preset range of the connection device 1, the connection device 1 will automatically input the user name and password to the computer 3, and when the sensor 2 is out of the preset range of the connection device 1, the connection device 1 will control the computer 3 to enter to the screen protection mode, thus to prevent the other user from using the computer and to accordingly protect the information stored therein.

2. The memory unit 13 of the connection device 1 stores the user name and password, when the sensor 2 is located within the preset range of the connection device 1, the connection device 1 will automatically input the user name and the password to the computer 3. Thus, the user needs not memorize the name and the password, and the user needs not spend time to input the name and password manually and thereby save time and operate with more convenience.

The major embodiment of the present invention includes enabling the computer to enter into the screen protection mode when the user and the sensor are away from the connection device to prevent other user from using the computer; and when the sensor positioned nearby the connection device, the user need not input the password to operate the computer. Thus, the information stored in the computer may be secured and provide the user more convenience to operate.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What is claimed is:

1. A method for securing computer information, wherein a computer will enter to an encoding status when a user is away from a connection device with a sensor to prevent other user from using said computer; and when said sensor positions within a preset range of said connection device, said computer will decode for user to operate; the method comprising:
   (A) electrically connecting said connection device to said computer;
   (B) initializing said connection device if it is needed, and proceed to step (C) otherwise proceed to step (D);
   (C) running an initialization;
   (D) said connection device verifying whether said sensor has a corresponding second identification code with said connection device in a preset period of time, wherein if it is not, proceed to step (E); otherwise, proceeds to step (F) if it is valid;
   (E) connection device controlling said computer for staying in encoding status; and
   (F) connection device transmitting a first identification code to said computer for decoding, said first identification code comprises a user name and a password for connecting said predetermined computer and said connection device; said second identification code comprises a connection code and a channel for connecting said connection device and sensor;

Step (C) further comprising the steps of
   (a) a user pressing key of said connection device is determined, wherein if it is determined that the key is pressed, proceed to step (d), otherwise proceed to step (b).
   (b) a light emitting element of said connection device generating light;
   (c) said connection device notifying said computer of invalid status of said sensor and proceed to (i);
   (d) said connection device detecting whether said sensor is plugged into said connection device, if said sensor is plugged in, proceed to step (e), otherwise return to step (d);
   (e) connection device detecting whether a button of said sensor is being pressed, wherein if said sensor is pressed, proceed to step (t), otherwise proceed to step (e);
   (t) generating said second identification code between said connection device and said sensor;
   (g) storing said second identification code generating between said connection device and said sensor;
   (h) shutting down a light emitting element of said connection device and a light emitting unit of said sensor; and
   (i) ending step (C).

2. The method for securing computer information according to claim 1, wherein connecting said connection device with said computer in said step (C), and plugging said sensor into said connection device, wherein said connection device requires user to input said user name and said password to said computer, and said connection device and said computer stores said inputted user name and password.

* * * * *